UNITED STATES PATENT OFFICE.

GEORGE N. JENNINGS, OF VIRGINIA CITY, NEVADA TERRITORY.

IMPROVED PROCESS FOR SEPARATING GOLD AND SILVER FROM MINERAL AND EARTHY SUBSTANCES.

Specification forming part of Letters Patent No. 46,909, dated March 21, 1865.

*To all whom it may concern:*

Be it known that I, GEORGE N. JENNINGS, of Virginia City, in the county of Storey and Territory of Nevada, have invented a new and Improved Process for Separating Gold, Silver, and other Metals from Mineral and Earthy Substances; and I do hereby declare that the following is a full, clear, and exact description thereof, which will enable others skilled in the art to fully understand and make use of the same.

This invention consists in a new process of separating gold, silver, and other metals from metalliferous rock in which ashes and charcoal are used as a flux, and the metals are finally obtained by a novel solution.

The quartz or mineral which bears the gold and silver, having been crushed, is first mixed with ashes or powdered charcoal, and the mass is then wet with diluted acid—either sulphuric, nitric, or muriatic. Sometimes I add a portion of alkali and mineral salts with the flux to help bring the silver into a chloride and the gold into a bright metallic state; but I always dissolve them before I use them with the flux. I then put the fluxed rock in a convenient place, where it is exposed to a gentle heat, and leave it a while, so that the acid may work on the metals before I place it in the furnace to roast it. If it is put at once into the furnace, it becomes coarse, and cannot be so easily operated upon. After the mass is roasted it is taken from the furnace and put, while hot, into a vessel containing diluted acid. The heat of the rock should be such as to make the diluted acid to boil, and while it is boiling the whole mass is to be stirred or agitated, and afterward left to settle. The different substances will settle according to their specific gravity. The gold, and nearly all of the other valuable metals, will be at the bottom, while the earthy matters will be in the middle, and the chloride will be at the top of the deposition and in the liquor. Upon striking the tub with a hammer a number of times after the contents have settled all the earthy matters will become comparatively dense and hard. I then run the liquor and chloride off with a siphon into another vessel and leave it to settle to get all the chloride by placing therein copper plates. The hard contents of the tub are to be cut up with a shovel, and water is added, and they are stirred and made to swim therein, as in the acid. This is repeated twice or thrice, the contents being allowed to settle and the water run off into the second vessel each time until most of the chloride is got out. After the chloride has settled in the second vessel I run off the clear liquor and dry the chloride and melt or amalgamate it. I then take out the contents from the tub or first vessel until I get near the bottom of the deposit, and put them into a pan for amalgamation to extract the fine particles of gold and silver which remain with the earthy matters, minerals, and metals by putting them in a solution of sulphate of soda and potassa, carbonate of soda; and if I do not use copper plates, I add also a solution of sulphate of copper. Salt and acid are applied to the mass before they are put into the solutions, and heat is then applied for the purpose of amalgamation. That part of the contents of the tub which remain at the bottom is also to be amalgamated with the above solution to extract the gold and silver (if any silver is found at the bottom) from any other valuable metals which may be present.

In order to determine the quantity of flux to be used with any particular kind of rock, I first ascertain the richness of the rock and what the gold and silver are combined with. I then take a sample—say one pound—of the rock and add such an amount of the flux, above mentioned, as I judge to be sufficient. I then roast it, and take a little at a time and put it into water. If the water appears white, it is a good sign that the flux and heat are bringing the silver into a chloride. A greater heat is then applied to bring all the silver into a chloride. For the purpose of determining whether all the silver is thus reduced, I take some of the roasted rock and put it into an evaporating-dish and boil it with nitric acid, and then test the liquor with muriatic acid. If I find the silver is all reduced into a chloride, the proportion of flux used is correct, and the rest of the rock may be treated according to the sample. If the flux does not bring all the silver into a chloride, I add a larger proportion of the flux to bring that result about.

Having thus described my invention, I claim as new and desire to secure by Letters Patent—

1. The process herein substantially described, for the purpose set forth.

2. The use of ashes and charcoal as a flux in reducing quartz and other rock for separating gold and silver and other metals therefrom, substantially in the manner above described.

3. The amalgamating solution composed substantially as above described.

GEORGE N. JENNINGS.

Witnesses:
 JOHN FAULL,
 H. GLOUBER.